United States Patent
Harrang et al.

(10) Patent No.: US 7,978,711 B2
(45) Date of Patent: Jul. 12, 2011

(54) SYSTEMS AND METHODS FOR BROADCASTING CONTENT USING SURPLUS NETWORK CAPACITY

(75) Inventors: Jeffrey Paul Harrang, Sammamish, WA (US); Chaz H Immendorf, Mill Creek, WA (US); David B Gibbons, Redmond, WA (US)

(73) Assignee: Opanga Networks, Inc., Washington (*) Notice: Subject to any disclaimer, the term of this patent is extended or adjusted under 35 U.S.C. 154(b) by 0 days.

(21) Appl. No.: 12/763,023

(22) Filed: Apr. 19, 2010

(65) Prior Publication Data
US 2011/0044227 A1  Feb. 24, 2011

Related U.S. Application Data

(60) Provisional application No. 61/235,602, filed on Aug. 20, 2009.

(51) Int. Cl.
*H04L 12/28* (2006.01)
(52) U.S. Cl. ............ 370/395.4; 370/341; 370/231; 379/221.07
(58) Field of Classification Search .......... None
See application file for complete search history.

(56) References Cited

U.S. PATENT DOCUMENTS

| | | | |
|---|---|---|---|
| 5,706,281 A | 1/1998 | Hashimoto et al. | |
| 5,706,428 A | 1/1998 | Boer et al. | |
| 5,726,978 A | 3/1998 | Frodigh et al. | |
| 5,974,460 A | 10/1999 | Maddalozzo et al. | |
| 6,038,224 A * | 3/2000 | Kim et al. | 370/342 |
| 6,052,734 A | 4/2000 | Ito. | |
| 6,311,065 B1 | 10/2001 | Ushiki et al. | |
| 6,327,677 B1 | 12/2001 | Garg et al. | |
| 6,339,785 B1 | 1/2002 | Feigenbaum | |
| 6,377,805 B1 | 4/2002 | Anvekar et al. | |
| 6,453,346 B1 | 9/2002 | Garg et al. | |
| 6,493,875 B1 | 12/2002 | Eames | |
| 6,512,865 B1 * | 1/2003 | Shen et al. | 385/24 |
| 6,529,476 B1 * | 3/2003 | Magnussen | 370/235 |
| 6,560,243 B1 | 5/2003 | Mogul | |
| 6,567,415 B1 * | 5/2003 | Elwalid et al. | 370/412 |
| 6,622,172 B1 | 9/2003 | Tam | |
| 6,651,105 B1 | 11/2003 | Bhagwat et al. | |
| 6,807,429 B2 | 10/2004 | Subrahmanya | |
| 6,845,398 B1 | 1/2005 | Galensky et al. | |
| 6,910,078 B1 | 6/2005 | Raman et al. | |
| 6,947,388 B1 | 9/2005 | Wagner | |
| 7,058,723 B2 | 6/2006 | Wilson | |
| 7,076,695 B2 | 7/2006 | McGee et al. | |
| 7,085,576 B2 * | 8/2006 | Ranganathan | 455/456.1 |
| 7,103,906 B1 | 9/2006 | Katz et al. | |

(Continued)

FOREIGN PATENT DOCUMENTS

DE  19831169  1/2000

(Continued)

*Primary Examiner* — Robert Wilson
(74) *Attorney, Agent, or Firm* — Michael J. Donohue; Davis Wright Tremaine LLP

(57) ABSTRACT

A system and method are described for broadcasting/multicasting content using surplus network capacity. The systems and methods are directed to solving the problem of how to simultaneously broadcast/multicast large content files to a plurality of users for later retrieval by using existing network capacity as opposed to being forced to add new capacity to handle peak demand. Generally, the methods comprise receiving data to be distributed, determining surplus network capacity, and distributing the data within the surplus network capacity to a plurality of subscriber devices.

20 Claims, 8 Drawing Sheets

U.S. PATENT DOCUMENTS

| | | | |
|---|---|---|---|
| 7,240,099 B2 | 7/2007 | Miyazaki et al. | |
| 7,349,337 B1 | 3/2008 | Mahdavi | |
| 7,451,205 B2 | 11/2008 | Chueng et al. | |
| 7,454,527 B2 | 11/2008 | Zhang et al. | |
| 7,496,675 B2 | 2/2009 | Obata et al. | |
| 7,512,066 B2 | 3/2009 | Santos et al. | |
| 7,519,030 B2 | 4/2009 | Cimini et al. | |
| 7,533,158 B2 | 5/2009 | Grannan et al. | |
| 7,536,626 B2 * | 5/2009 | Sutivong et al. | 714/760 |
| 7,539,752 B1 | 5/2009 | Chakravarti et al. | |
| 7,543,052 B1 | 6/2009 | Cesa Klein | |
| 7,568,045 B1 | 7/2009 | Agrawal | |
| 7,577,908 B2 | 8/2009 | Frazier et al. | |
| 7,594,260 B2 | 9/2009 | Porras et al. | |
| 7,617,312 B2 | 11/2009 | Tummalapalli | |
| 7,643,461 B2 * | 1/2010 | Choi et al. | 370/341 |
| 7,650,111 B2 * | 1/2010 | Dennisson et al. | 455/3.06 |
| 7,650,376 B1 | 1/2010 | Blumenau | |
| 7,688,733 B1 | 3/2010 | Mirza | |
| 7,698,416 B2 | 4/2010 | Potti et al. | |
| 7,765,324 B2 | 7/2010 | Imiya | |
| 2002/0021465 A1 | 2/2002 | Moore | |
| 2002/0081971 A1 | 6/2002 | Travistino | |
| 2002/0116555 A1 | 8/2002 | Sommers et al. | |
| 2002/0156910 A1 | 10/2002 | Senda | |
| 2002/0159396 A1 | 10/2002 | Carlson et al. | |
| 2003/0014496 A1 | 1/2003 | Spencer et al. | |
| 2003/0028890 A1 | 2/2003 | Swart et al. | |
| 2003/0084182 A1 | 5/2003 | Mahiddini et al. | |
| 2003/0099201 A1 | 5/2003 | Hu et al. | |
| 2003/0145100 A1 | 7/2003 | Marchetto et al. | |
| 2003/0174677 A1 | 9/2003 | Mantha | |
| 2003/0204769 A1 | 10/2003 | Coughlin | |
| 2003/0221008 A1 | 11/2003 | England et al. | |
| 2004/0002362 A1 | 1/2004 | Chuah et al. | |
| 2004/0003105 A1 | 1/2004 | Berzosa et al. | |
| 2004/0015445 A1 | 1/2004 | Heaven et al. | |
| 2004/0017788 A1 | 1/2004 | Shmueli | |
| 2004/0042398 A1 | 3/2004 | Peleg et al. | |
| 2004/0066746 A1 | 4/2004 | Matsunaga | |
| 2004/0117459 A1 | 6/2004 | Fry | |
| 2004/0122969 A1 | 6/2004 | Ameigeiras et al. | |
| 2004/0143652 A1 | 7/2004 | Grannan et al. | |
| 2004/0168052 A1 | 8/2004 | Clisham et al. | |
| 2004/0218563 A1 | 11/2004 | Porter et al. | |
| 2005/0058138 A1 | 3/2005 | Burcher et al. | |
| 2005/0091395 A1 | 4/2005 | Harris et al. | |
| 2005/0091398 A1 | 4/2005 | Roberts et al. | |
| 2005/0128995 A1 | 6/2005 | Ott et al. | |
| 2005/0132049 A1 | 6/2005 | Inoue et al. | |
| 2005/0165948 A1 | 7/2005 | Hatime | |
| 2005/0169184 A1 | 8/2005 | Murgatroyd et al. | |
| 2005/0193069 A1 | 9/2005 | Brown et al. | |
| 2005/0198680 A1 | 9/2005 | Baran et al. | |
| 2005/0239412 A1 | 10/2005 | Kelz | |
| 2005/0256926 A1 | 11/2005 | Muhonen et al. | |
| 2005/0281270 A1 | 12/2005 | Kossi et al. | |
| 2005/0281277 A1 | 12/2005 | Killian | |
| 2005/0282500 A1 | 12/2005 | Wang et al. | |
| 2005/0289630 A1 | 12/2005 | Andrews et al. | |
| 2006/0019665 A1 | 1/2006 | Aghvami et al. | |
| 2006/0025151 A1 | 2/2006 | Karaoguz et al. | |
| 2006/0026296 A1 | 2/2006 | Nagaraj | |
| 2006/0150055 A1 | 7/2006 | Quinard et al. | |
| 2006/0176824 A1 | 8/2006 | Laver et al. | |
| 2006/0268336 A1 | 11/2006 | Sakaniwa et al. | |
| 2006/0277277 A1 * | 12/2006 | Landschaft et al. | 709/220 |
| 2006/0282856 A1 | 12/2006 | Errico et al. | |
| 2007/0025301 A1 | 2/2007 | Petersson et al. | |
| 2007/0066297 A1 | 3/2007 | Jeidari-Bateni | |
| 2007/0086347 A1 | 4/2007 | Reynolds | |
| 2007/0142067 A1 | 6/2007 | Cheng et al. | |
| 2007/0165732 A1 | 7/2007 | Gerlach | |
| 2007/0211674 A1 | 9/2007 | Karlberg et al. | |
| 2007/0239695 A1 | 10/2007 | Chakra et al. | |
| 2008/0126919 A1 | 5/2008 | Uskali et al. | |
| 2008/0161951 A1 | 7/2008 | Morris | |
| 2008/0162403 A1 | 7/2008 | Neeakantan | |
| 2008/0165693 A1 | 7/2008 | Castro et al. | |
| 2008/0195745 A1 | 8/2008 | Bowra et al. | |
| 2008/0208963 A1 | 8/2008 | Eyal et al. | |
| 2008/0212509 A1 | 9/2008 | Kim et al. | |
| 2008/0215873 A1 | 9/2008 | Bobrow | |
| 2008/0319833 A1 | 12/2008 | Svendsen | |
| 2009/0100469 A1 | 4/2009 | Conradt et al. | |
| 2009/0164624 A1 | 6/2009 | Metcalf et al. | |
| 2009/0164646 A1 | 6/2009 | Christian et al. | |
| 2009/0327512 A1 | 12/2009 | Chapweske | |
| 2010/0198943 A1 * | 8/2010 | Harrang et al. | 709/217 |
| 2011/0044227 A1 * | 2/2011 | Harrang et al. | 370/312 |

FOREIGN PATENT DOCUMENTS

| | | |
|---|---|---|
| DE | 10208094 | 9/2003 |
| EP | 1587290 | 10/2005 |
| EP | 1841172 | 10/2007 |
| JP | 07336375 | 12/1995 |
| JP | 10124412 | 5/1998 |
| JP | 2005-258912 | 9/2005 |
| KR | 10-2002-0017926 | 3/2002 |
| KR | 10-2004-0028401 | 4/2004 |
| KR | 10-0438697 | 7/2004 |
| KR | 10-0645742 | 11/2006 |
| KR | 10-2007-0011811 | 1/2007 |
| KR | 10-2007-0013600 | 1/2007 |
| KR | 10-0693023 B1 | 3/2007 |
| KR | 10-2007-0117197 | 12/2007 |
| KR | 10-0807264 B1 | 2/2008 |
| KR | 10-2008-0039324 | 5/2008 |
| WO | WO 93-20637 | 10/1993 |
| WO | WO 02/47414 | 6/2002 |
| WO | WO 2004-144639 | 12/2004 |
| WO | WO 2005-120122 | 12/2005 |
| WO | WO 2006/099545 | 9/2006 |

* cited by examiner

SYSTEMS AND METHODS FOR BROADCASTING CONTENT USING SURPLUS NETWORK CAPACITY

CROSS REFERENCE TO RELATED APPLICATIONS

The present application claims the benefit of U.S. Provisional Application No. 61/235,602, filed Aug. 20, 2009, which is incorporated herein by reference.

FIELD OF THE INVENTION

The field of the present invention generally relates to systems and methods for simultaneously distributing digital content to a plurality of users in a communications system. In one preferred embodiment, the system and method supports broadcast/multicast capabilities where a single copy of a digital packet is received by all or a selected few of subscriber devices associated with a base station.

BACKGROUND OF THE INVENTION

Digital media content distribution services continue to grow at an astonishing rate in response to the evolution of modern data communications networks that can facilitate high-speed data transfers for vast amounts of digital media content data. Whether digital media content distribution occurs over wireline networks, such as fiber-optic or cable networks, satellite networks, or over wireless networks, such as 3G, 3GPP LTE, LTE Advanced, WiMAX, or 4G cellular networks, the trend of increasing distribution service capacity and flexibility remains a key objective for most media content service providers. Over the past decade, consumer exposure to state-of-the-art digital media content distribution and playback technologies (e.g., digital video recorders (DVRs), multi-function cellular phones, PDAs, satellite radio and television devices, e-books devices, etc.) has created a significant demand for improved digital media content delivery services.

These new technologies have revolutionized the way consumers procure and utilize a wide variety of digital media content. A non-exhaustive listing of modern digital media content types include: movies, TV programs, home video, software applications, video games, podcasts, music, e-books, etc. Most distribution services for these media content types occur over the Internet at media content provider website stores (e.g., Apple® I-Tunes™, Microsoft® Zune™, and Amazon® Kindle™ Stores), media content websites (e.g., Hulu.com, YouTube.com, ABC.com, NBC.com, comedycentral.com, etc.), or over proprietary cable, fiber-optic, satellite, and cellular networks (e.g., provided by various media content services providers (e.g., Comcast® Digital Cable, Verizon® FIOS™, DirectTV®, Sirius® XM Radio™, and AT&T® Wireless).

In the past, such media content may have been delivered using a common broadcasting technique by transmitting the particular media content to all subscriber devices capable of receiving the transmission (e.g., broadcasting an analog TV signal). Alternatively, media content may also be delivered using multicasting, which is similar to broadcasting in the sense that one transmission is received by a plurality of receiver devices, although in multicasting the receiving devices may be specified for restricted reception (e.g., subscriber-based cable TV).

Modern networks support a variety of traffic types such as voice traffic, data traffic, and transfer of other media content. When large numbers of network users simultaneously transfer particularly burdensome media content files, such as high definition audiovisual files, networks can become congested. This congestion can negatively affect cumulative network throughput as well as the Quality of Service (QOS) and the Quality of Experience (QOE) for most network users.

To remedy the problems associated with congestion and the lack of network capacity (e.g., available network bandwidth) during peak usage periods of operation, network service providers often commit to expensive, time-consuming technology additions and/or upgrades. These network enhancements serve to alleviate network congestion periods and to avoid persistent customer service calls from irritated customers. This solution may not be desirable, however, because of the costs associated with physical upgrades and because of the inevitable swelling of demand to fill the increased capacity.

In view of the foregoing, it would be optimal to implement systems and methods for reducing congestion and increasing throughput in a communication network without having to increase overall capacity of the communication network.

SUMMARY OF THE INVENTION

This summary is provided to introduce (in a simplified form) a selection of concepts that are further described below in the Detailed Description. This summary is not intended to identify key features of the claimed subject matter, nor is it intended to be used as an aid in determining the scope of the claimed subject matter.

In overcoming the above disadvantages associated with current content distribution schemes, the present invention discloses systems and methods for broadcasting content using surplus network capacity. In an embodiment, the present invention discloses a computer-implemented method for delivering media content using surplus network capacity, which may include: receiving data to be distributed; determining surplus network capacity; and distributing the data to at least one subscriber device within the surplus network capacity.

In accordance with another aspect of the present invention, determining surplus network capacity may include: determining an unused portion of a downlink channel for a particular time frame; and scheduling a portion of the data to be distributed in the particular time frame.

In accordance with another aspect of the present invention, receiving data to be distributed may include: receiving the data at a wireless base station from a network; and caching the data in a memory at the wireless base station.

In accordance with another aspect of the present invention, receiving data to be distributed may include: formatting the data into multiple sub-blocks to be distributed to at least one subscriber device.

In accordance with another aspect of the present invention, distributing the data to at least one subscriber device may include: simultaneously multicasting the data to multiple subscriber devices.

In accordance with another aspect of the present invention, distributing the data to at least one subscriber device does not interfere with cross traffic on a transmission channel.

In accordance with another aspect of the present invention, the invention may further include storing the distributed data at the at least one subscriber device for later retrieval by a user.

In accordance with yet another aspect of the present invention, a communication system for delivering media content using surplus network capacity may include: a base station; at least one subscriber device associated with the base station; and a data communication network associated with the base station, wherein the system is configured to: receive data to be distributed; determine surplus network capacity; and distribute the data to the at least one subscriber device within the surplus network capacity.

In accordance with yet another aspect of the present invention is a computer readable medium encoded with computer-executable instructions for delivering media content using surplus network capacity, which when executed, performs a method which may include: receiving data to be distributed; determining surplus network capacity; and distributing the data to at least one subscriber device within the surplus network capacity.

BRIEF DESCRIPTION OF THE DRAWINGS

Preferred and alternative examples of the present invention are described in detail below by way of example and with reference to the drawings, in which.

DETAILED DESCRIPTION

Figure 1:
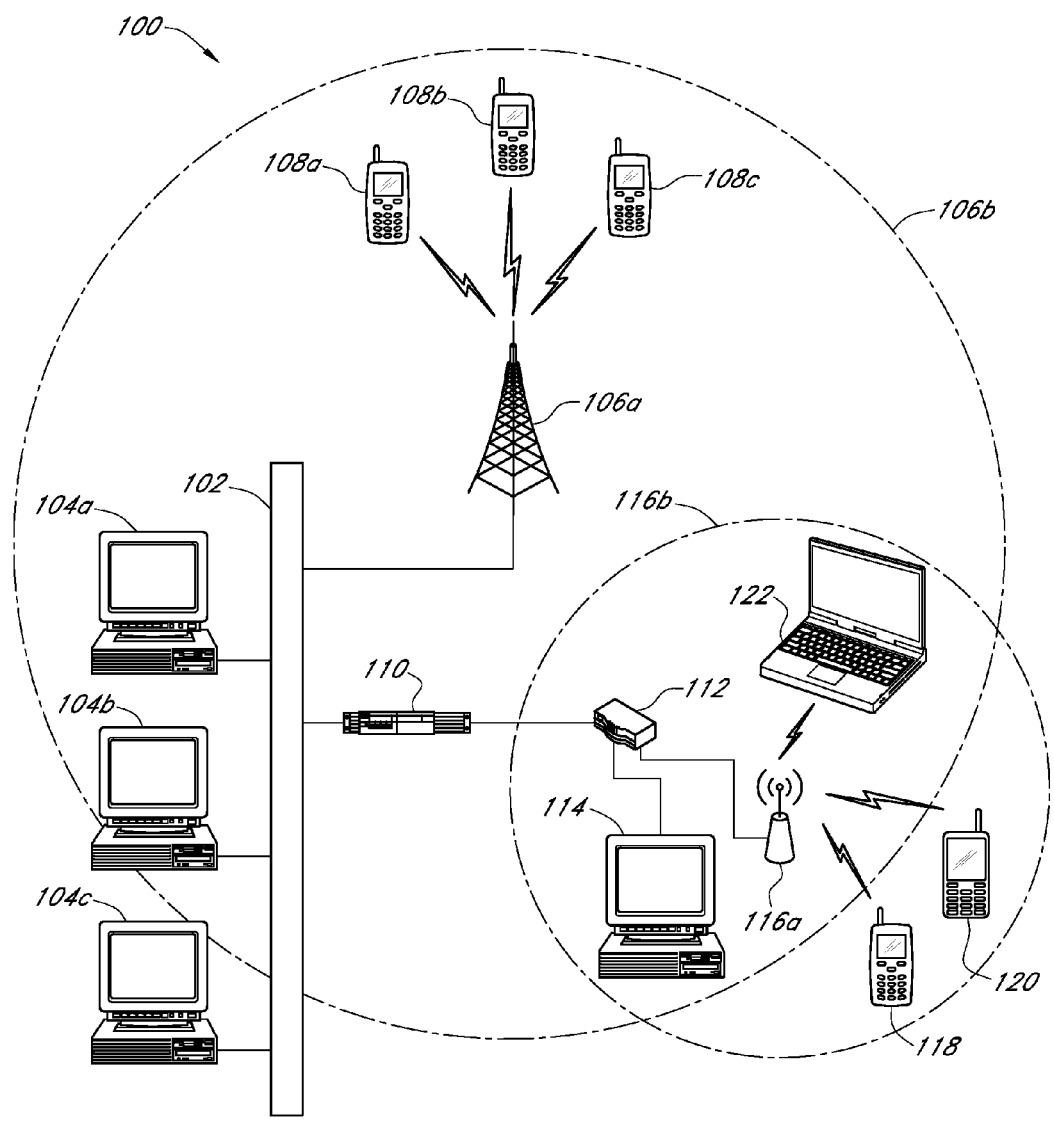
FIG. 1 illustrates a perspective view of a networked computing system in accordance with an embodiment of the present invention.

In accordance with an exemplary embodiment of the present invention, FIG. 1 illustrates a perspective view of a networked computing system 100 including various wireline and wireless computing devices that may be utilized to implement any of the processes for broadcasting content using surplus network capacity associated with various embodiments of the present invention. The networked computing system 100 may include, but is not limited to, one or more remote base station devices 106a, which may be associated with a macrocell, a microcell, or a picocell base station that may be a neighboring base station to one or more short-range base station devices 116a (e.g., a femtocell or picocell device) within a particular region of the networked computing system 100; a group of remote service provider devices 104a-c, including server computers or any other common network device known in the art such as routers, gateways, or switch devices, which can support network resource allocation and/or digital data communication services to various network subscriber computing devices (e.g., any of the devices 108a-c, 110, 112, 114, 116a, 118, 120, and 122); a data communications network 102, including both Wide Area Network 106b (WAN), and Local Area Network 116b (LAN) portions; a variety of wireless user equipment, including: cellular phone or PDA devices 108a-c, 118 and 120, and a laptop or netbook computer 122, along with any other common portable wireless computing devices well known in the art (e.g., handheld gaming units, personal music players, video recorders, electronic book devices, etc.) that are capable of communicating with the data communications network 102 utilizing one or more of the remote base stations 106a, the short-range base station device 116a, or any other common wireless or wireline network communications technology; one or more network gateways or switch devices 110 and router 112 that can facilitate data communications processes within the LAN and between the LAN and the WAN of the data communications network 102; and a desktop computer 114 optionally connected to the LAN. While FIG. 1 only illustrates one long-range base station device 106a and one short-range base station device 116a, it may be apparent that the networked computing system 100 may include multiple base stations with varying degrees of size and overlap.

In an embodiment, the remote base station 106a, the short-range base station device 116a (e.g., a femtocell or picocell base station), the remote service provider devices 104a-c, or any of the user equipment (e.g., 108a-c, 114, 118, 120, or 122) may be configured to run any well-known operating system, including, but not limited to: Microsoft® Windows®, Mac OS®, Google® Chrome®, Linux®, Unix®, or any well-known mobile operating system, including Symbian®, Palm®, Windows Mobile®, Google® Android®, Mobile Linux®, MXI®, etc. In an embodiment, the remote base station 106a may employ any number of common server, desktop, laptop, and personal computing devices.

In an embodiment, the user equipment (e.g., 108a-c, 114, 118, 120, or 122) may include any combination of common mobile computing devices (e.g., laptop computers, netbook computers, cellular phones, PDAs, handheld gaming units, electronic book devices, personal music players, MiFi™ devices, video recorders, etc.), having wireless communications capabilities employing any common wireless data commutations technology, including, but not limited to: GSM™, UMTS™, LTE™, LTE Advanced™, WiMAX™, WiFi™, etc.

In an embodiment, either of the LAN or the WAN portions of the data communications network 102 of FIG. 1 may employ, but are not limited to, any of the following common communications technologies: optical fiber, coaxial cable, twisted pair cable, Ethernet cable, and powerline cable, along with any wireless communication technology known in the art. In an embodiment, the remote wireless base station 106a, the wireless user equipment (e.g., 108a-c, 118, 120, or 122), as well as any of the other LAN connected computing devices (e.g., 110, 112, or 114) may include any standard computing software and hardware necessary for processing, storing, and communicating data amongst each other within the networked computing system 100. The computing hardware realized by any of the network computing system 100 devices (e.g., 104a-c, 106a, 108a-c, 110, 112, 114, 116a, 118, 120, or 122) may include, but is not limited to: one or more processors, volatile and non-volatile memories, user interfaces, transcoders, modems, and wireline and/or wireless communications transceivers, etc.

Further, any of the networked computing system 100 devices (e.g., 104a-c, 106a, 108a-c, 110, 112, 114, 116a, 118, 120, or 122) may be configured to include one or more computer-readable media (e.g., any common volatile or non-volatile memory type) encoded with a set of computer readable instructions, which when executed, performs a portion of any of the resource allocation processes associated with various embodiments of the present invention.

In an embodiment, user equipment (e.g., 108a-c, 118, 120, and 122) may simultaneously reside within the wireless communications coverage area 116b of the short-range base station device 116a as well as within the wireless communications coverage area 106b of the base station 106a, or the user equipment may reside in a single, non-overlapping area of LAN 116b or WAN 106b.

Figure 2:
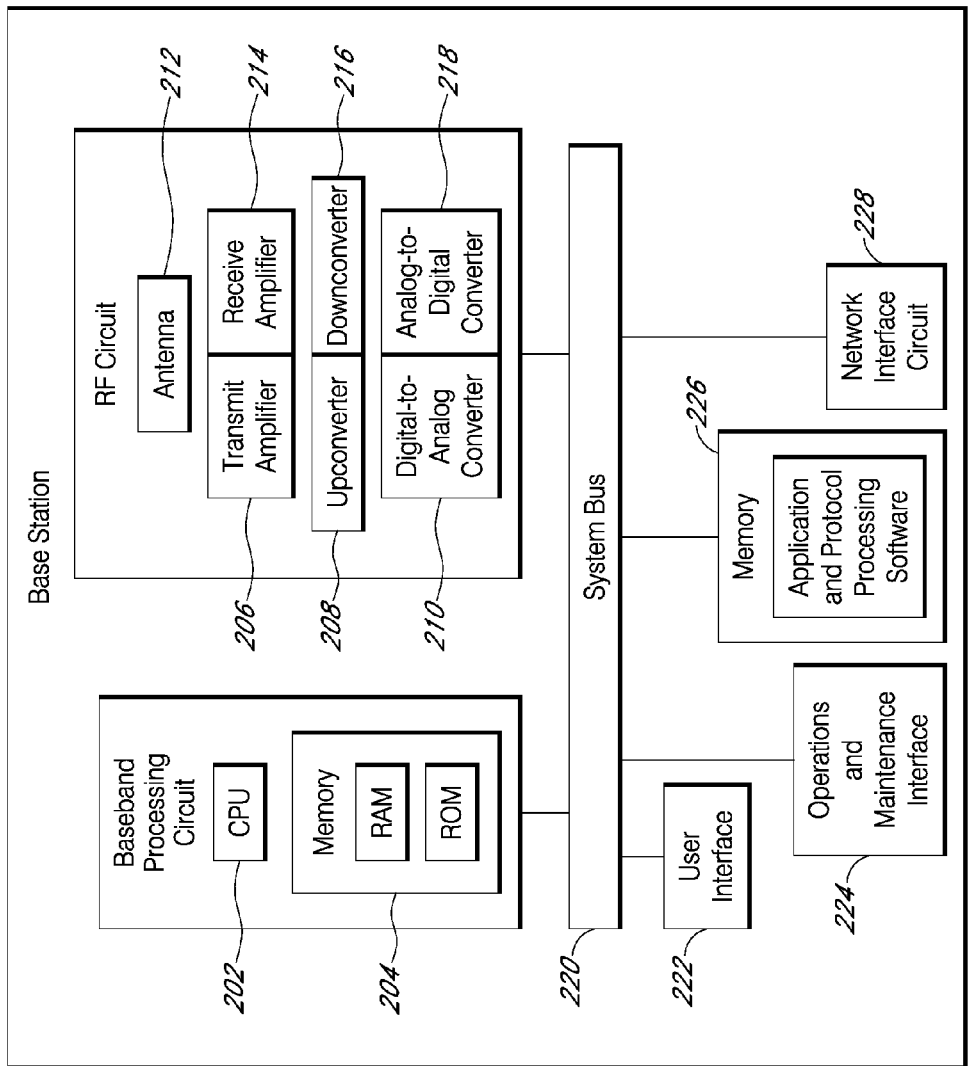
FIG. 2 illustrates a block diagram view of a base station in accordance with an embodiment of the present invention.

FIG. 2 illustrates a block diagram view of a base station device 200 (e.g., a femtocell, picocell, microcell, or a macrocell device) that may be representative of the long-range base station device 106a and/or the short-range base station device 116a in FIG. 1. In accordance with an embodiment of the present invention, the base station device 200 may include, but is not limited to, a baseband processing circuit including at least one central processing unit (CPU) 202. In an embodiment, the CPU 202 may include an arithmetic logic unit (ALU, not shown) that performs arithmetic and logical operations and one or more control units (CUs, not shown) that extract instructions and stored content from memory and then executes and/or processes them, calling on the ALU when necessary during program execution. The CPU 202 is responsible for executing all computer programs stored on the base station device's 200 volatile (RAM) and nonvolatile (ROM) system memories, 204 and 226.

The base station device 200 may also include, but is not limited to, a radio frequency (RF) circuit for transmitting and receiving data to and from the network. The RF circuit may include, but is not limited to, a transmit path including a digital-to-analog converter 210 for converting digital signals from the system bus 220 into analog signals to be transmitted, an upconverter 208 for setting the frequency of the analog signal, and a transmit amplifier 206 for amplifying analog signals to be sent to the antenna 212. Further, the RF circuit may also include, but is not limited to, a receive path including the receive amplifier 214 for amplifying the signals received by the antenna 212, a downconverter 216 for reducing the frequency of the received signals, and an analog-to-digital converter 218 for outputting the received signals onto the system bus 220. The system bus 220 facilitates data communication amongst all the hardware resources of the base station device 200.

Further, the base station device 200 may also include, but is not limited to, a user interface 222; operations and maintenance interface 224; memory 226 storing application and protocol processing software for performing the surplus network capacity determination, buffering, error correction, and other processes in accordance with the present invention; and a network interface circuit 228 facilitating communication across the LAN and/or WAN portions of the data communications network 102 (i.e., a backhaul network).

In accordance with an embodiment of the present invention, the base station 200 may use any modulation/encoding scheme known in the art such as Binary Phase Shift Keying (BPSK, having 1 bit/symbol), Quadrature Phase Shift Keying (QPSK, having 2 bits/symbol), and Quadrature Amplitude Modulation (e.g., 16-QAM, 64-QAM, etc., having 4 bits/symbol, 6 bits/symbol, etc.). Additionally, the base station 200 may be configured to communicate with the subscriber devices (e.g., 108a-c, 118, 120, and 122) via any Cellular Data Communications Protocol, including any common GSM, UMTS, WiMAX or LTE protocol.

Figure 3:
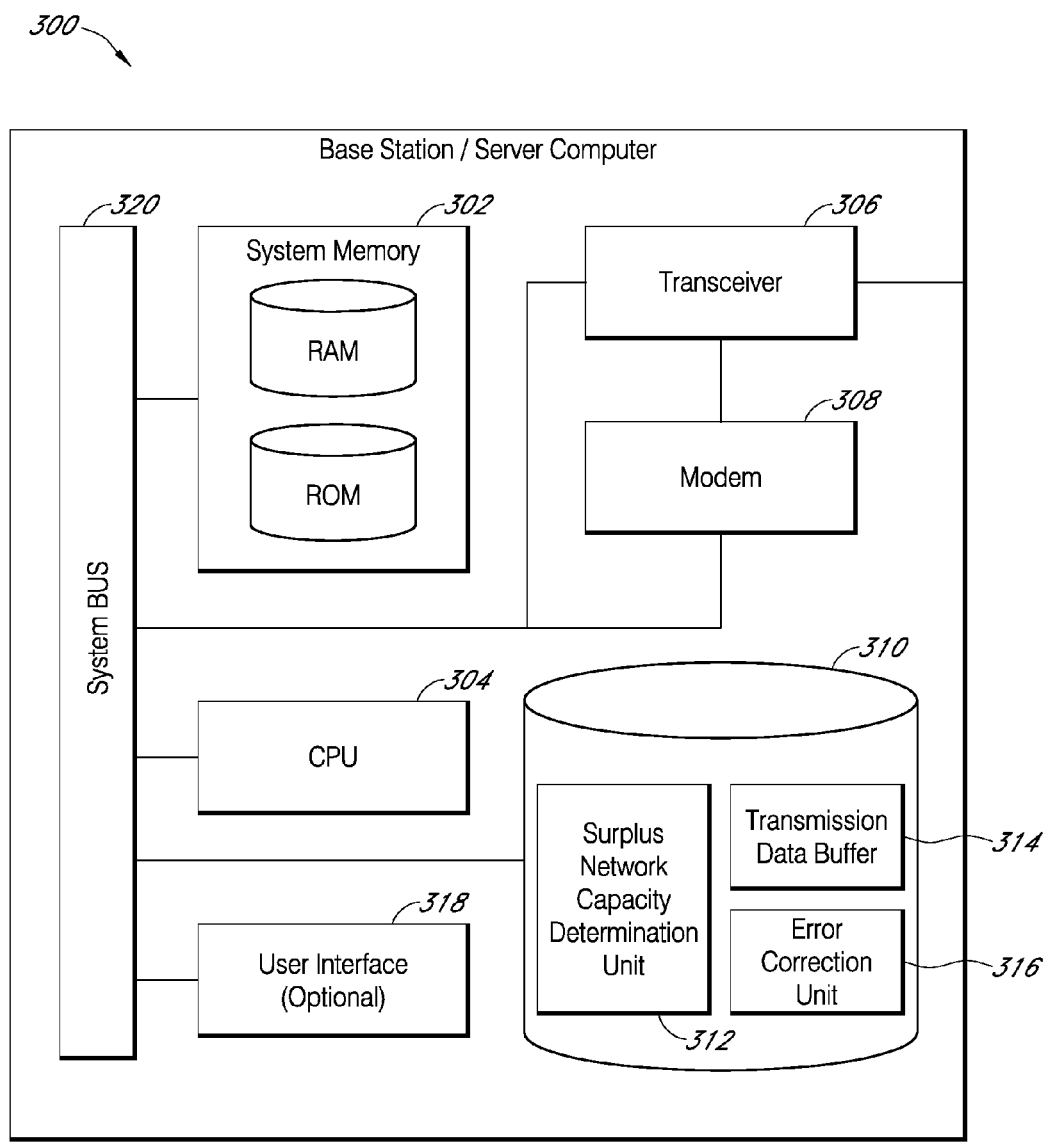
FIG. 3 illustrates a block diagram of a base station and/or a server computer in accordance with an embodiment of the present invention.

FIG. 3 illustrates a block diagram view of a base station and/or server computer 300 that may be representative of any of the remote service provider devices 104a-c or the base station 106a and 116a in FIG. 1, or any other common network device known in the art such as a router, gateway, or switch device. The server computer 300 may include, but is not limited to, one or more processor devices including a central processing unit (CPU) 304. In an embodiment, the CPU 304 may include an arithmetic logic unit (ALU, not shown) that performs arithmetic and logical operations and one or more control units (CUs, not shown) that extracts instructions and stored content from memory and then executes and/or processes them, calling on the ALU when necessary during program execution. The CPU 304 is responsible for executing all computer programs stored on the server computer's 300 volatile (RAM), nonvolatile (ROM), and long-term storage system memories, 302 and 310.

The server computer 300 may also include, but is not limited to, an optional user interface 318 that allows a server administrator to interact with the server computer's 300 software and hardware resources and to display the performance and operation of the networked computing system 100; a software/database repository 310 including: a surplus network capacity determination unit 312 that may broadcast, multicast, and/or unicast digital content using surplus network capacity in accordance with the present invention; transmission data buffer 316 that may store data and format data into sub-blocks to be transmitted (e.g., content distribution in FIGS. 6-8); and an error correction unit 314 for correcting any transmission errors in accordance with the present invention. Further, the server computer 300 may also include a modem 308 for formatting data communications prior to transfer; a transceiver 306 for transmitting and receiving network communications amongst various network base stations, user equipment, and computing devices utilizing the data communication network 102 of the networked computing system 100; and a system bus 320 that facilitates data communications amongst all the hardware resources of the server computer 300.

Figure 4:
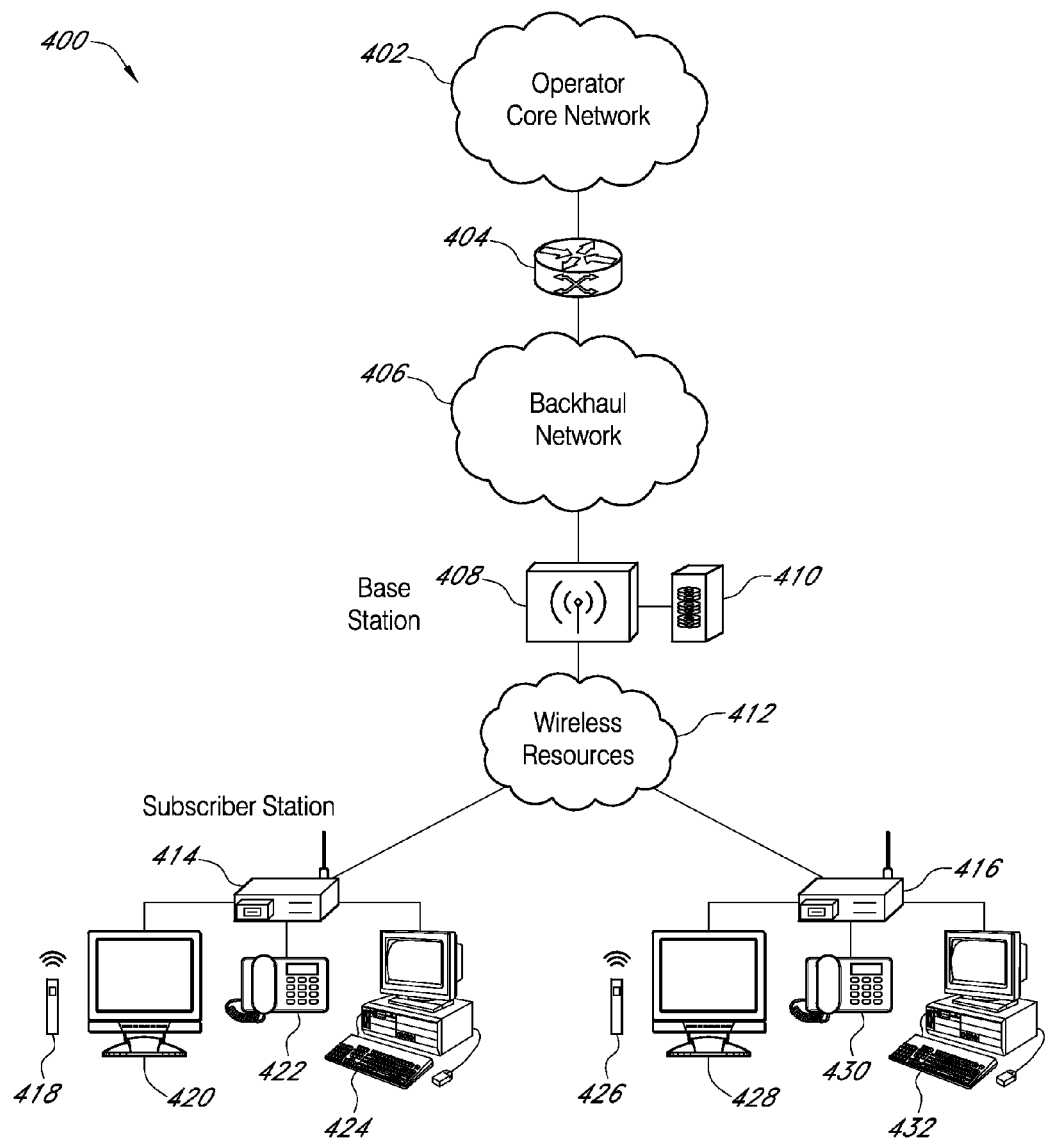
FIG. 4 illustrates various communication paths and networks between wireless base stations in accordance with an embodiment of the present invention.

FIG. 4 illustrates a network architecture 400 with various communication paths and networks between wireless base stations in accordance with an embodiment of the present invention. The base stations and subscriber stations 408, 414, and 416 depicted in FIG. 4 may be representative of the base stations 106a and/or 116a depicted in FIG. 1. In an embodiment, the network architecture 400 and operator core network 402 may be consistent with a LTE network topology, while other specific topologies may be utilized dependent on the chosen mobile standards such as GSM, UMTS, WiMAX, WiFi, etc. The subscriber devices 418, 420, 422, 424, 426, 428, 430, and 432 in FIG. 4 may correspond with any of the subscriber devices 108a-c, 114, 118, 120, and 122 in FIG. 1. Router 404 and remote service provider 410 in FIG. 4 may correspond to router devices 110 and 112 and remote service providers 104a-c in FIG. 1. Backhaul network 406 in FIG. 4 may correspond to the data communications network 102 in FIG. 1.

By way of general explanation, content is initially delivered to a base station 408 local cache. The content cached at base station 408 is broadcast/multicast when surplus capacity is available in a network resource such as a downlink channel sub-frame. Finally, content is received by the subscriber stations (i.e., base stations) 414 and 416, and then content is viewed by consumers on subscriber devices (e.g., 418, 420, 422, 424, 426, 428, 430, and 432). This process may be repeated between any head-end entity (e.g., a base station) and all or selected user stations (e.g., user equipment or subscriber devices) attached to the head end. The general process described above is explained in detail in the remaining FIGS. 5-8.

Figure 5:
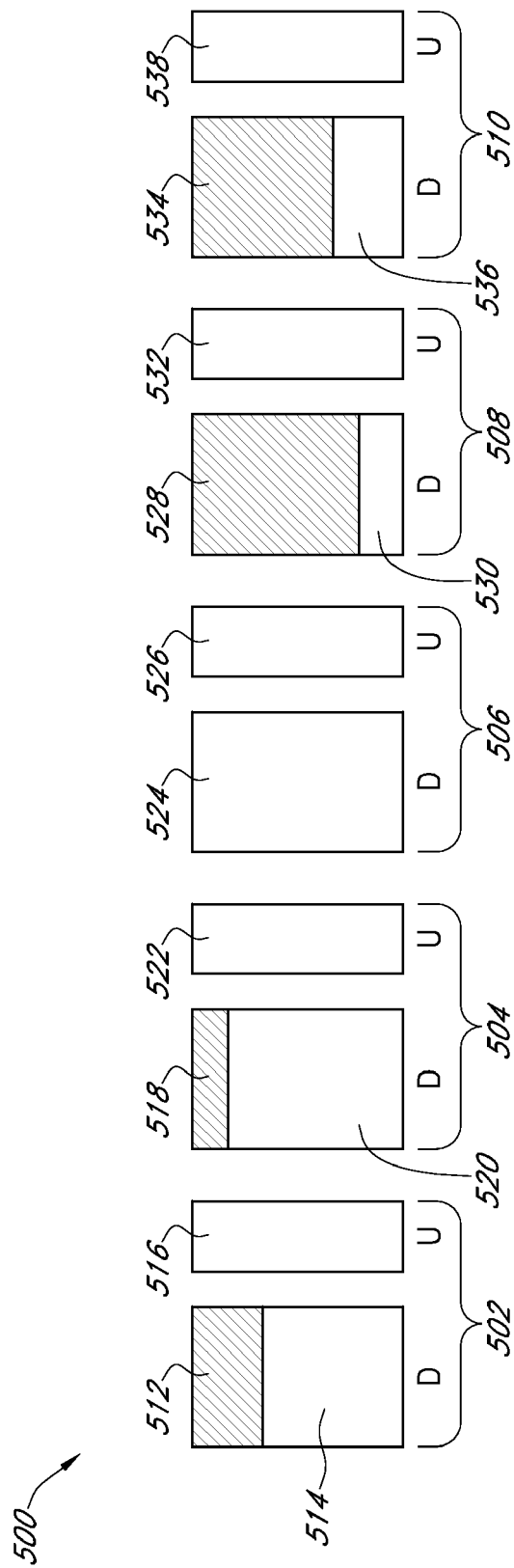
FIG. 5 illustrates a diagram of wireless resources in a wireless transmission in accordance with an embodiment of the present invention.

FIG. 5 illustrates a diagram of wireless resources 500 in a wireless transmission in accordance with an embodiment of the present invention. Wireless resources 500 may correspond to time-division duplexing wherein the resources switch back and forth between transmit resources and receive resources, or the wireless resources 500 may correspond to frequency-division duplexing where transmit and receive radio channels operate concurrently on separate frequency blocks. The present invention applies equally to time-division or frequency-division duplexing, satellite technology, any wireline technology, or any cellular/wireless distribution known in the Art.

For each time frame 502, 504, 506, 508, and 510, a base station device 408 or remote service provider device 410 analyzes the downlink transmission channel to determine the allocation of resources. In the downlink channel of frame 502 (e.g., represented by D), the used capacity is represented by wireless resources 514, while the surplus capacity is represented as block 512. The uplink channels (e.g., represented by U) are referenced as wireless resources 516, 522, 526, 532, and 538.

As the network utilization varies over time, the used portion of the downlink channel (e.g., wireless resources 514, 520, 524, 530, and 536) varies within frames 502, 504, 506, 508, and 510. As the used portion of the downlink channel (e.g., cross traffic) varies, the surplus capacity (e.g., 512, 518, 528, 534) varies and is available to be used in the present invention. Media content may be broadcast, multicast, and/or unicast within each surplus capacity resource frame 512, 518, 528, and 534 without interfering with the present used downlink capacity in order to maximize the use of the channel capacity.

Typically, surplus capacity is determined by a network element that runs a frame scheduler that controls data sent on a downlink channel. In one embodiment, this scheduler resides in a base station as an application in memory 226 or as the surplus network capacity determination unit 312 (e.g., when FIG. 3 represents a base station). By way of example, this determination may be made in a base station in block 708 in FIG. 7. In another embodiment, the scheduler/determination unit may be located in a central unit designed to control a group of base stations (e.g., determination unit 312 when FIG. 3 represents a remote service provider such as 104*a-c*). In another embodiment, the determination is made by a network element that is separate from a frame scheduler that controls the data sent on a downlink channel. By way of example, a determination of this type is shown as the determination step in block 806 of FIG. 8.

Figure 6:
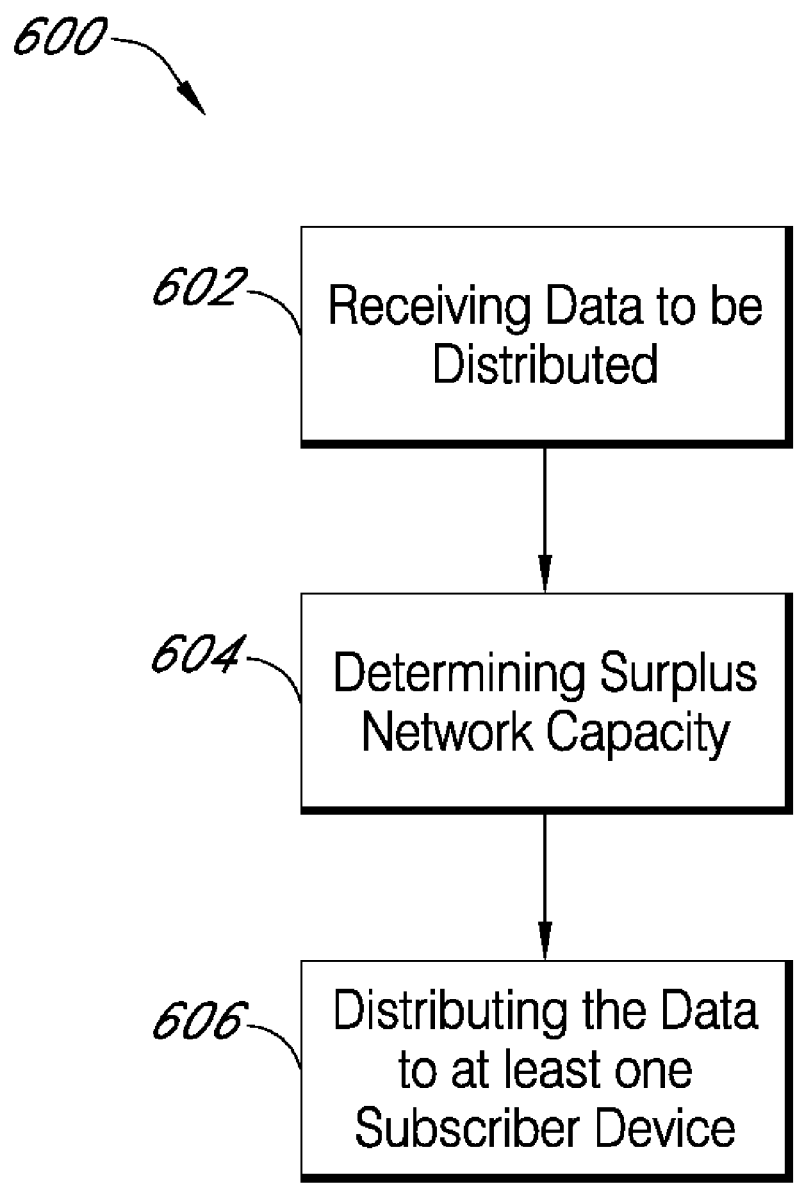
FIG. 6 illustrates a flow diagram depicting processes for broadcasting content in accordance with an embodiment of the present invention.

FIG. 6 illustrates a flow diagram 600 depicting processes for broadcasting/multicasting media content in accordance with an embodiment of the present invention. It should be understood that this process 600 could be executed using one or more computer-executable programs stored on one or more computer-readable media located on any one of the base station devices (e.g., 106*a*, 116*a*, 200, 408, 414, and 416), or collaboratively on the network base station 106*a*, 300, or 408, the group of remote service provider devices 104*a-c* or 410, or on any other common service provider device known in the Art of FIGS. 1-4. As mentioned above in relation to FIG. 4, the basic inventive process steps are shown in FIG. 6. First, in block 602 data to be distributed is received. In one embodiment, the base station 106*a* or 408 may receive the data to be distributed. Next, in block 604 the process continues by determining surplus network capacity. In one embodiment, determining surplus network capacity corresponds to the surplus network capacity determined in FIG. 5. Finally, in block 606 the received data is distributed to at least one subscriber device within the surplus network capacity determined in block 604. In one embodiment, the process repeats for each time frame until the received data is distributed completely to the subscriber devices.

Figure 7:
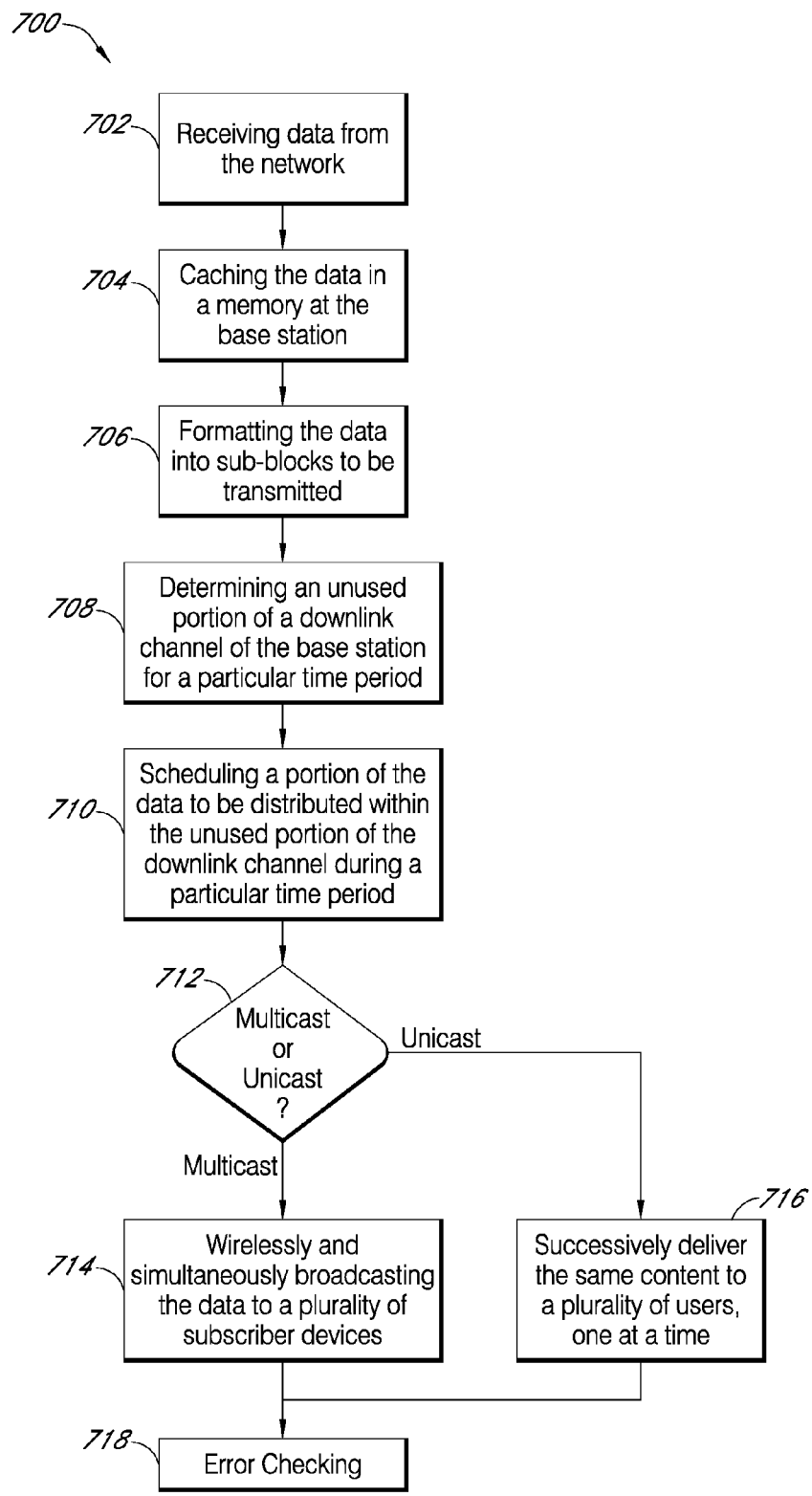
FIG. 7 illustrates a flow diagram depicting processes for broadcasting content in accordance with an embodiment of the present invention.

FIG. 7 illustrates a flow diagram 700 depicting processes for broadcasting/multicasting media content in accordance with an embodiment of the present invention. Again, it should be understood that this process 700 could be executed using one or more computer-executable programs stored on one or more computer-readable media located on any one of the base station devices (e.g., 106*a*, 116*a*, 200, 408, 414, and 416), or collaboratively on the network base station 106*a*, 408, or 300, the group of remote service provider devices 104*a-c* or 410, or on any other common service provider device known in the Art of FIGS. 1-4. At block 702 the process comprises receiving data from the network. In one embodiment, the network may correspond to the networks 102 and 406. A non-exhaustive listing of modern digital media content types that may be received from the network include: movies, TV programs, home video, software applications, video games, podcasts, music, e-books, etc. In block 704, the data is cached in a memory (e.g., 204, 226, and 310) at the base station (e.g., 106*a*, 116*a*, 200, 300, 408, 414, and 416). More generally, the data may be cached in any head-end component in a communications network or in any head-end component relative to downstream subscriber devices. At block 706, the process formats the data into sub-blocks to be transmitted, according to various methods known in the Art, so that successive portions of the content file may be sent at a time.

At block 708, the process determines an unused portion of a downlink channel of the base station for a particular time period. In one embodiment, the base station (e.g., 106*a*, 116*a*, 200, 300, 408, 414, and 416) may easily determine surplus capacity because the base station is responsible for orchestrating all the communication with the various subscriber devices. For example, if the total downlink channel capacity is N Bytes per time unit and only M Bytes (M<N) are scheduled for transmission in that time unit, then N-M Bytes are unused and may be used to send a portion of the cached content. An alternate embodiment is shown in FIG. 8.

At block 710, the process schedules a portion of the data to be distributed during a particular time period. The amount of data to be transmitted during the time period corresponds to the unused capacity determined in block 708. The type of scheduling may depend on whether the data is to be broadcast in a multicast fashion or in a unicast fashion, determined in block 712. If the data is to be broadcast as a multicast in block 714, the base station wirelessly and simultaneously broadcasts the data to a plurality of predetermined or selected devices. In one embodiment, a single copy of a digital packet sent from a head end (i.e., a base station) is received by all or selected subscriber devices associated with the base station. Once the recipient device (e.g., a subscriber device) receives the transmission, the subscriber device may store the data until later retrieval by a user once the entire content has been received or once a predetermined fraction of the content has been received. If the data is to be broadcast as a unicast in block 716, the process successively delivers the same content to a plurality of users, one at a time. This method does not achieve the same efficiency gains as the multicast method of transmission, but may be desirable for other reasons such as security or for error correction. In one embodiment in the unicast delivery in block 716, each subscriber device may receive the content in succession based on a random or priority ordering of users. Further, once a user received the entire content file, the next user in a list would begin to receive content until all users received the content. In either of a broadcast, multicast, or unicast delivery, the data is delivered using otherwise unused channel capacity.

The broadcast or multicast channel may not allow error-free transmission to all intended stations at all times. Block 718 may support methods of detecting and correcting transmission errors by existing means, which will be discussed for completeness. Detection methods include but are not limited to: checksums, frame check sequences, and cyclic redundancy checks. Correction methods include but are not limited to: automatic repeat request (ARQ), hybrid ARQ, negative acknowledgement protocols, duplicate transmissions, or a combination of some or all of these methods. Some of these detection and correction capabilities may be provided transparently by lower protocol layers of the channel itself, while others may be provided at higher application layers. In one embodiment, these correction methods do not have to run according to a critical time schedule because the content delivery event is separated in time from content use by the end user. Retransmission of detected error portions of the content may be accomplished by sending just those sub blocks of the digital content that span the errors, rather than repeating transmission of the entire content file. Receiving stations track which content files have errors and replace retransmitted sub blocks in order to create entirely error-free content files. The cycle of error detection, reporting, and retransmission may be repeated until all or most of the stations have error-free copies, or a maximum number of attempts have been made.

Figure 8:
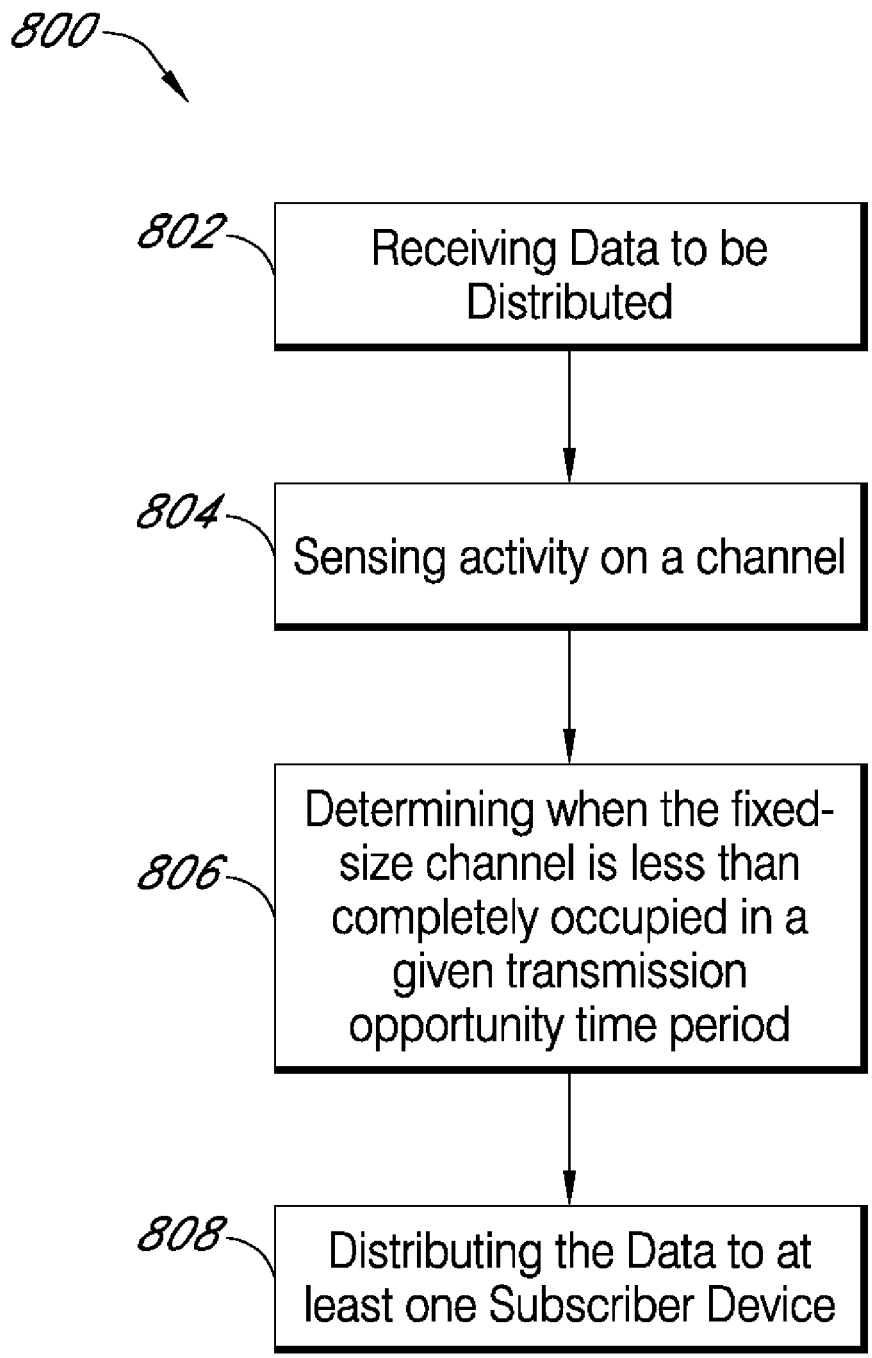
FIG. 8 illustrates a flow diagram depicting processes for broadcasting content in accordance with an embodiment of the present invention.

FIG. 8 illustrates a flow diagram 800 depicting processes for broadcasting/multicasting media content in accordance with an embodiment of the present invention. Again, it should be understood that this process 800 could be executed using one or more computer-executable programs stored on one or more computer-readable media located on any one of the base station devices (e.g., 106a, 116a, 200, 408, 414, and 416), or collaboratively on the network base station 106a, 408, or 300, the group of remote service provider devices 104a-c or 410, or on any other common service provider device known in the Art of FIGS. 1-4. The process in block 802 again comprises receiving data to be distributed. This process step may correspond to the steps in blocks 602, 702, 704, and 706. Next, at block 804 the process senses activity on a channel. This step may be performed when the base station or head end is not completely responsible for scheduling all wireless resources, as may be the case in an intermediate base station unit. In one embodiment, the process senses activity on the channel (e.g., CSMA-CA in a shared bus configuration) and can determine when the fixed-size channel is less than completely occupied in a given transmission opportunity time period in block 806. Once the surplus channel capacity is determined by the head end (i.e., a base station device), the head end transmits a portion of the remaining unsent cached content that fills the unoccupied channel capacity. Transmission may constitute distributing the data to at least one subscriber device in block 808.

In conclusion, the present invention solves the problem of how to simultaneously broadcast/multicast large content files to a plurality of users for later retrieval, by using existing network capacity as opposed to being forced to add new capacity to handle peak demand. As many access networks having similar requirements are faced with the same capacity and congestion problems, this invention is applicable to, but not limited to: direct-to-home satellite, wireless (cellular 3G/LTE, WiMAX, WiFi), and cable.

The invention is novel because it takes advantage of unused network capacity to simultaneously broadcast content to users, especially relevant to wireless (e.g. WiMAX/802.16, 3G/LTE) networks where total network capacity is a scarce resource. Previous broadcast approaches explicitly provide for content delivery bandwidth in the overall booked traffic, thereby reducing the capacity to simultaneously serve other applications. Notably, the invention may use ordinary channel capacity that is otherwise used for carrying user traffic when it is present. In one embodiment, the invention may not use extraordinary methods or modifications of the transmission channel, thereby reducing any technical hurdles to integrating the invention with existing technology.

If implemented, operators will be able to offer services to deliver selected popular content to arbitrary numbers of their customers without impacting their overall network capacity requirements. The key business impact is that the operators will be able to increase the revenue per user by offering new popular content delivery services, without incurring additional network expansion capital expenditures.

The invention is highly likely to be used in commercial settings because of the ease of scaling the service to arbitrary numbers of customers. It is anticipated that the invention may become a standard or recommended service architecture based on future operator adoption. Further, it may be difficult or impossible to design around the systems and methods described herein using surplus capacity to deliver content without otherwise impacting the delivery network. Detecting use of the invention may be relatively easy in a commercial service due to the unique service functionality that the invention enables.

While several embodiments of the present invention have been illustrated and described herein, many changes can be made without departing from the spirit and scope of the invention. Accordingly, the scope of the invention is not limited by any disclosed embodiment. Instead, the scope of the invention should be determined from the appended claims that follow.

The embodiments of the invention in which an exclusive property or privilege is claimed are defined as follows:

1. A computer-implemented method for delivering media content using surplus network capacity "the computer-implemented method", comprising:
   receiving data to be transmitted on a wireless communication link in addition to cross-traffic on the wireless communication link;
   determining surplus network capacity on the wireless communication link for a particular time period wherein the cross-traffic and a portion of the received data do not exceed the network capacity on the wireless communication link for the particular time period; and
   transmitting both the cross-traffic and the portion of the received data over the wireless communication link during the particular time period wherein the received data is transmitted to at least one subscriber device within the surplus network capacity.

2. The computer-implemented method of claim 1, wherein determining surplus network capacity comprises:
   determining an unused portion of a downlink channel for the particular time frame; and
   scheduling the portion of the received data to be transmitted in the particular time frame.

3. The computer-implemented method of claim 1, wherein receiving data to be distributed comprises:
   receiving the data at a wireless base station from a network; and
   caching the data in a memory at the wireless base station.

4. The computer-implemented method of claim 1, wherein receiving data to be distributed comprises:

formatting the data into multiple sub-blocks to be distributed to the at least one subscriber device.

5. The computer-implemented method of claim 1, wherein distributing the data to at least one subscriber device comprises:
   simultaneously multicasting the data to a plurality of subscriber devices.

6. The computer-implemented method of claim 1, wherein distributing the data to at least one subscriber device does not interfere with cross traffic on a transmission channel.

7. The computer-implemented method of claim 1, further comprising:
   storing the distributed data at the at least one subscriber device for later retrieval by a user.

8. A communication system for delivering media content using surplus network capacity "the communication system", comprising:
   a base station configured to receive data to be transmitted;
   at least one subscriber device associated with the base station and configured to receive the received data transmitted from the base station; and
   a data communication network associated with the base station, wherein the communication system is configured to:
   determine surplus network capacity on a wireless communication link wherein cross-traffic to be transmitted on the wireless communication link and a portion of the received data do not exceed the network capacity on the wireless communication link; and
   transmit both the cross-traffic and the portion of the received data at a particular time wherein the received data is transmitted to the at least one subscriber device within the surplus network capacity.

9. The communication system of claim 8, wherein determining surplus network capacity comprises:
   determining an unused portion of a downlink channel of the base station for the particular time frame; and
   scheduling the portion of the received data to be transmitted in the particular time frame.

10. The communication system of claim 8, wherein receiving data to be distributed comprises:
    receiving the data at the base station from the data communication network; and
    caching the data in a memory at the base station.

11. The communication system of claim 8, wherein receiving data to be distributed comprises:
    formatting the data into multiple sub-blocks to be distributed to the at least one subscriber device.

12. The communication system of claim 8, wherein distributing the data to at least one subscriber device comprises:
    simultaneously multicasting the data to a plurality of subscriber devices.

13. The communication system of claim 8, wherein distributing the data to at least one subscriber device does not interfere with cross traffic on a transmission channel.

14. The communication system of claim 8, wherein each of the at least one subscriber device comprises a processor configured to detect and correct transmission errors.

15. A non-transitory computer readable medium encoded with computer-executable instructions for delivering media content using surplus network capacity, which when executed, performs steps comprising:
    receiving data to be distributed transmitted on a wireless communication link I addition to cross-traffic on the wireless communication link;
    determining surplus network capacity on the wireless communication link for a particular time period wherein the cross-traffic and a portion of the received data do not exceed the network capacity on the wireless communication link for the particular time period; and
    transmitting both the cross-traffic and the portion of the received data over the wireless communication link during the particular time period wherein the data to at least one subscriber device within the surplus network capacity.

16. The non-transitory computer readable medium of claim 15, wherein determining surplus network capacity comprises:
    determining an unused portion of a downlink channel for the particular time frame; and
    scheduling the portion of the data to be distributed in the particular time frame.

17. The non-transitory computer readable medium of claim 15, wherein receiving data to be distributed comprises:
    receiving the data at a wireless base station from a network; and
    caching the data in a memory at the wireless base station.

18. The non-transitory computer readable medium of claim 15, wherein receiving data to be distributed comprises:
    formatting the data into multiple sub-blocks to be distributed to the at least one subscriber device.

19. The non-transitory computer readable medium of claim 15, wherein distributing the data to at least one subscriber device comprises:
    simultaneously multicasting the data to a plurality of subscriber devices.

20. The non-transitory computer readable medium of claim 15, wherein distributing the data to at least one subscriber device does not interfere with cross traffic on a transmission channel.

* * * * *